US00RE46847E

(19) United States
(12) Reissued Patent
Huang

(10) Patent Number: US RE46,847 E
(45) Date of Reissued Patent: May 15, 2018

(54) TRANSMISSION DEVICE FOR PHOTOSENSITIVE DRUM

(71) Applicant: GENERAL PLASTIC INDUSTRIAL CO., LTD., Taichung (TW)

(72) Inventor: Shih-Chieh Huang, Taichung (TW)

(73) Assignee: General Plastic Industrial Co., LTD., Taichung (TW)

(21) Appl. No.: 14/811,004

(22) Filed: Jul. 28, 2015

Related U.S. Patent Documents

Reissue of:
(64) Patent No.: 9,031,465
Issued: May 12, 2015
Appl. No.: 13/965,856
Filed: Aug. 13, 2013

(30) Foreign Application Priority Data

Jul. 8, 2013 (TW) ..... 102124445

(51) Int. Cl.
*G03G 15/00* (2006.01)

(52) U.S. Cl.
CPC ..... *G03G 15/757* (2013.01)

(58) Field of Classification Search
CPC ..... G03G 15/757; G03G 21/1857; G03G 221/1657; G03G 2215/00156; G03G 15/0142; G03G 21/1853; G03G 21/1839
See application file for complete search history.

(56) References Cited

U.S. PATENT DOCUMENTS 4,829,335 A * 5/1989 Kanemitsu ..... G03G 15/757 399/111
5,210,574 A * 5/1993 Kita ..... 399/117
5,845,175 A * 12/1998 Kumar ..... F16D 1/0858 399/111
5,903,803 A * 5/1999 Kawai ..... F16D 1/101 399/111
8,270,876 B2 9/2012 Morioka et al.
8,295,734 B2 10/2012 Ueno et al.
(Continued)

FOREIGN PATENT DOCUMENTS

CN 201532527 U 7/2010
DE 202014100621 U1 6/2014
(Continued)

*Primary Examiner* — Sam Rimell
(74) *Attorney, Agent, or Firm* — Locke Lord LLP; Tim Tingkang Xia, Esq.

(57) ABSTRACT

A transmission device for a photosensitive drum includes a sleeve, a transmission unit disposed in the sleeve and capable of moving and rotating at the same time, an elastic member, and a shell receiving the sleeve and the elastic member so that a relatively larger radius section and a relatively smaller radius section of the elastic member exert elastic force on the sleeve and the transmission unit, respectively. The transmission unit has two engagement blocks and a receiving space between them. Each engagement block has an inclined outer surface, an inner surface, an inclined top surface and an engagement concave connecting the inner and outer surfaces. The engagement concaves are opened toward opposite directions for engagement with two pillars of a drive member of an electronic image forming apparatus respectively. As a result, the transmission device can be connected with and separated from the drive member smoothly.

27 Claims, 23 Drawing Sheets

(56) References Cited

U.S. PATENT DOCUMENTS

| | | | | |
|---|---|---|---|---|
| 8,615,184 | B2 * | 12/2013 | Zhou | G03G 15/757 399/111 |
| 2006/0153587 | A1 * | 7/2006 | Omura et al. | 399/89 |
| 2008/0193156 | A1 * | 8/2008 | Omura et al. | 399/75 |
| 2011/0182619 | A1 | 7/2011 | Batori et al. | |
| 2011/0217073 | A1 * | 9/2011 | He | 399/111 |
| 2011/0255900 | A1 * | 10/2011 | Zhou et al. | 399/111 |
| 2012/0251175 | A1 | 10/2012 | Peng et al. | |
| 2012/0294649 | A1 | 11/2012 | Kikuchi et al. | |
| 2013/0322923 | A1 | 12/2013 | Ikeda | |
| 2014/0294499 | A1 | 10/2014 | Hallacher | |
| 2015/0030353 | A1 | 1/2015 | Wang | |

FOREIGN PATENT DOCUMENTS

| | | | |
|---|---|---|---|
| WO | 2012113289 | A1 | 8/2012 |
| WO | 2012113299 | A1 | 8/2012 |
| WO | 2012152203 | A1 | 11/2012 |

* cited by examiner

TRANSMISSION DEVICE FOR PHOTOSENSITIVE DRUM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*This application is an application for reissue of U.S. Pat. No. 9,031,465, issued from U.S. application Ser. No. 13/965,856, filed Aug. 13, 2013, and claims foreign priority to and the benefit of Taiwan Patent Application No. TW102124445, filed Jul. 8, 2013 in the Intellectual Property Office of Taiwan (R.O.C.), which are hereby incorporated herein in their entireties by reference.*

BACKGROUND OF THE INVENTION

1. Field of the Invention

The present invention relates generally to photosensitive drums mounted in electronic imaging devices, such as printers, copy machines, and so on, and more particularly, to a transmission device for a photosensitive drum.

2. Description of the Related Art

A photosensitive drum, which is one of the most important components of an electronic imaging device, is installed in a toner cartridge to conduct electricity when photosensitized and attract carbon powders at the same time to develop the to-be-printed document. A photosensitive drum primarily comprises a photosensitive cylinder and a transmission device attached to an end of the photosensitive cylinder. The transmission device is adapted to be connected with a drive member in a housing of an electronic image forming apparatus to transmit rotatory kinetic energy from the drive member to the photosensitive cylinder.

The conventional transmission device for a photosensitive drum, which comprises a transmission member capable of engagement with the drive member, is usually provided with the design that the transmission member can be pushed by the drive member to swing, such as which disclosed in U.S. Pat. No. 8,295,734, or the design that the transmission member can be pushed by the drive member to move axially, such as which disclosed in China Utility Model Patent No. CN201532527U. By means of the aforesaid designs, the transmission member will be engaged with the drive member when the user puts the toner cartridge into the electronic image forming apparatus and separated from the drive member when the user takes the toner cartridge out of the electronic imaging device.

However, the aforesaid transmission device for a photosensitive drum, which is provided with a transmission member capable of swinging or moving axially, is complicated in structure so as to be difficult in manufacture and assembly.

SUMMARY OF THE INVENTION

The present invention has been accomplished in view of the above-noted circumstances. It is an objective of the present invention to provide a transmission device for a photosensitive drum, which can be connected with and separated from a drive member of an electronic image forming apparatus in a different way from the conventional ones and is simpler in structure.

It is another objective of the present invention to provide a transmission device for a photosensitive drum, which can be connected with a drive member of an electronic image forming apparatus firmly and separated from the drive member smoothly.

To attain the above objectives, the present invention provides a transmission device for a photosensitive drum, which is adapted for engagement with a drive member of an electronic image forming apparatus provided with two pillars and comprises a transmission unit, a sleeve, a shell, and an elastic member. The transmission unit comprises a shaft and an engagement structure. The shaft extends along an imaginary axis and is provided with a first end facing toward a first direction, a second end facing toward a second direction opposite to the first direction, and at least a protrusion extending along a radial direction of the shaft. The engagement structure is provided with a base attached to the first end of the shaft, two engagement blocks extending from two opposite sides of the base away from the imaginary axis and toward the first direction, and a receiving space located between the engagement blocks for receiving the drive member. Each engagement block has an outer surface extending gradually close to the imaginary axis toward the first direction, an inner surface facing the receiving space, an inclined top surface at a junction between the outer surface and the inner surface, an engagement concave at another junction between the outer surface and the inner surface, and a vertex located between the inclined top surface and the engagement concave, wherein an included angle between an extending direction of the inclined top surface and the imaginary axis is not equal to 90 degrees, and the engagement concaves of the engagement blocks are opened substantially toward opposite directions for allowing the pillars of the drive member to enter the engagement concaves through openings of the engagement concaves. The sleeve has a main body, an axial hole penetrating the main body along the imaginary axis, and at least a through groove located at the main body, communicated with the axial hole and inclined relative to the imaginary axis. The shaft of the transmission unit is disposed in the axial hole and capable of rotating and moving axially. The through groove and the inclined top surfaces of the engagement blocks of the transmission unit extend toward the first direction aslope along the same rotation direction. The protrusion of the shaft is inserted into the through groove movably. The shell has a pipe for mounted to an end of the photosensitive drum, a top wall located at a side of the pipe, a bottom wall located at another side of the pipe, and a receiving hole extending along the imaginary axis and opened on the top wall for receiving the main body of the sleeve so that the sleeve is coupled with the shell unrotatably and movably along the imaginary axis. The elastic member has a relatively larger radius section and a relatively smaller radius section connected with the relatively larger radius section. The relatively larger radius section is disposed in the receiving hole of the shell and has two ends abutted against the bottom wall of the shell and the sleeve respectively. The relatively smaller radius section is disposed in the axial hole of the sleeve and has an end abutted against the second end of the shaft of the transmission unit.

As a result, the transmission device for a photosensitive drum provided by the present invention is simpler in structure than the conventional ones, wherein the engagement concaves of the engagement structure can be engaged with the pillars of the drive member of the electronic image forming apparatus so that the transmission unit can be driven to rotate. Besides, when the user is going to connect the transmission device with the drive member of the electronic image forming apparatus or separate the transmission device from the drive member of the electronic imaging device, the engagement structure will be pushed by the drive member of the electronic image forming apparatus so that the transmission unit will move axially along the sleeve. At the same time, the protrusion of the shaft will be guided by the through groove of the sleeve so that the transmission unit will rotate. As a result, the transmission unit can be connected with the drive member of the electronic image forming apparatus firmly and separated from the drive member smoothly by moving and rotating at the same time.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
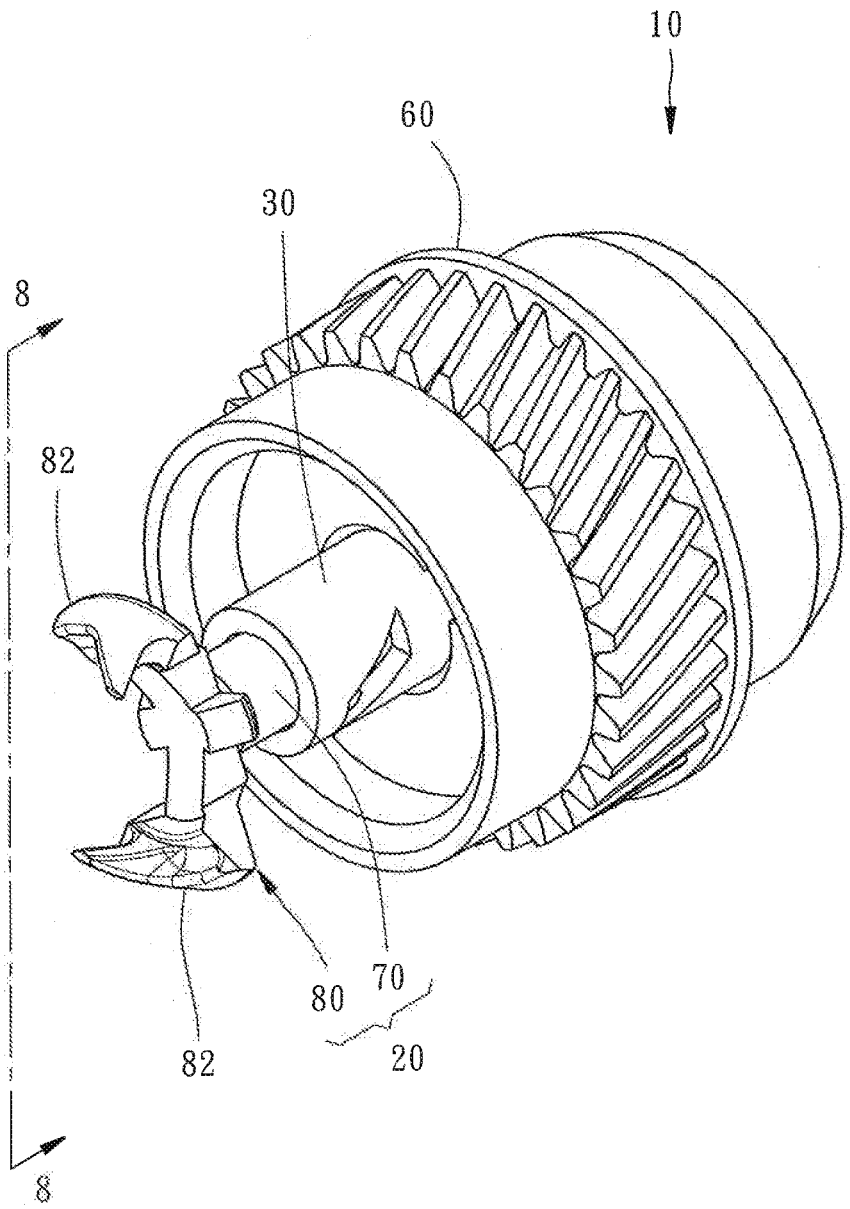
FIG. 1 is an assembled perspective view of a transmission device for a photosensitive drum provided by a first preferred embodiment of the present invention.
Figure 2:
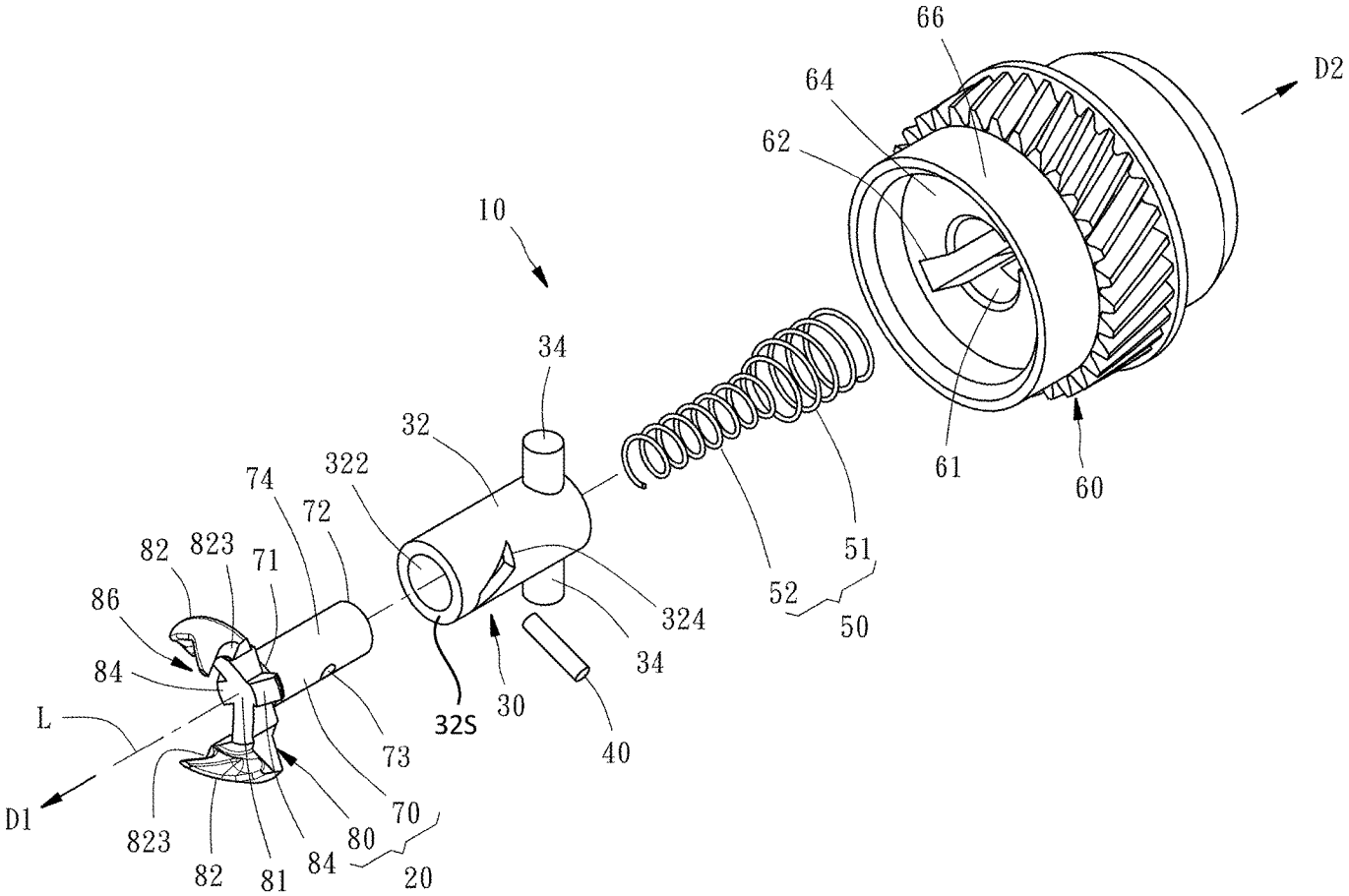
FIG. 2 is an exploded perspective view of the transmission device for a photosensitive drum provided by the first preferred embodiment of the present invention.

Referring to FIGS. 1-2, a transmission device 10 for a photosensitive drum, which is provided by a first preferred embodiment of the present invention, comprises a transmission unit 20, a sleeve 30, an elastic member 50, and a shell 60.

The transmission unit 20 comprises a shaft 70 and an engagement structure 80. The shaft 70 comprises a cylindrical shaft body 74 and a pin 40. The shaft body 74 is an elongated element extending along an imaginary axis L and provided with a first end 71 facing toward a first direction D1, a second end 72 facing toward a second direction D2 opposite to the first direction D1, and an opening 73 penetrating through the main portion of the shaft body 74 along its radial direction. The engagement structure 80 comprises a base 81 attached to the first end 71 of the shaft 70 integrally, two relatively bigger engagement blocks 82 and two relatively smaller guiding blocks 84 attached to the base 81 integrally, and a receiving space 86 located between the engagement blocks 82.

Figure 3:
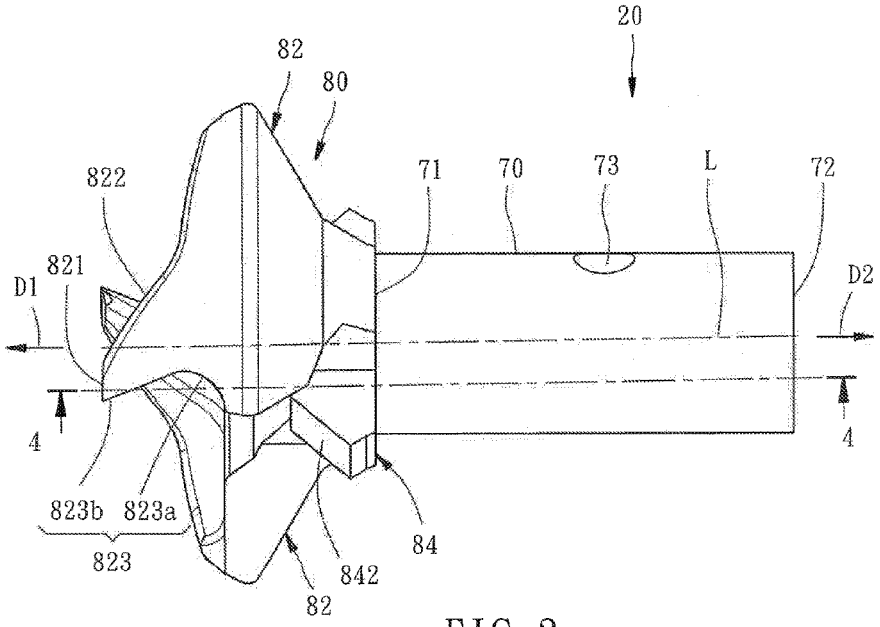
FIG. 3 is a plane view of a transmission unit of the transmission device for a photosensitive drum provided by the first preferred embodiment of the present invention.
Figure 4:
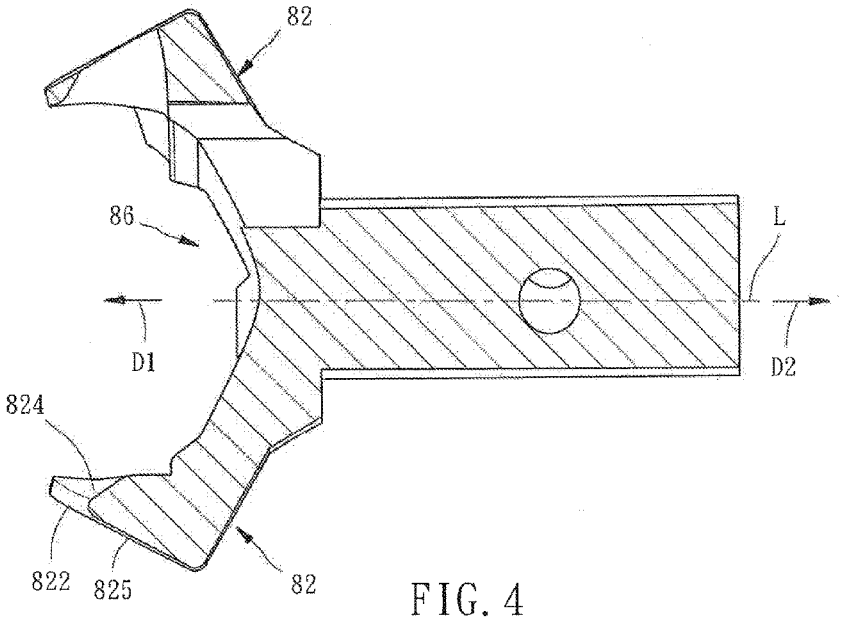
FIG. 4 is a sectional view taking along the line 4-4 in FIG. 3.
Figure 5:
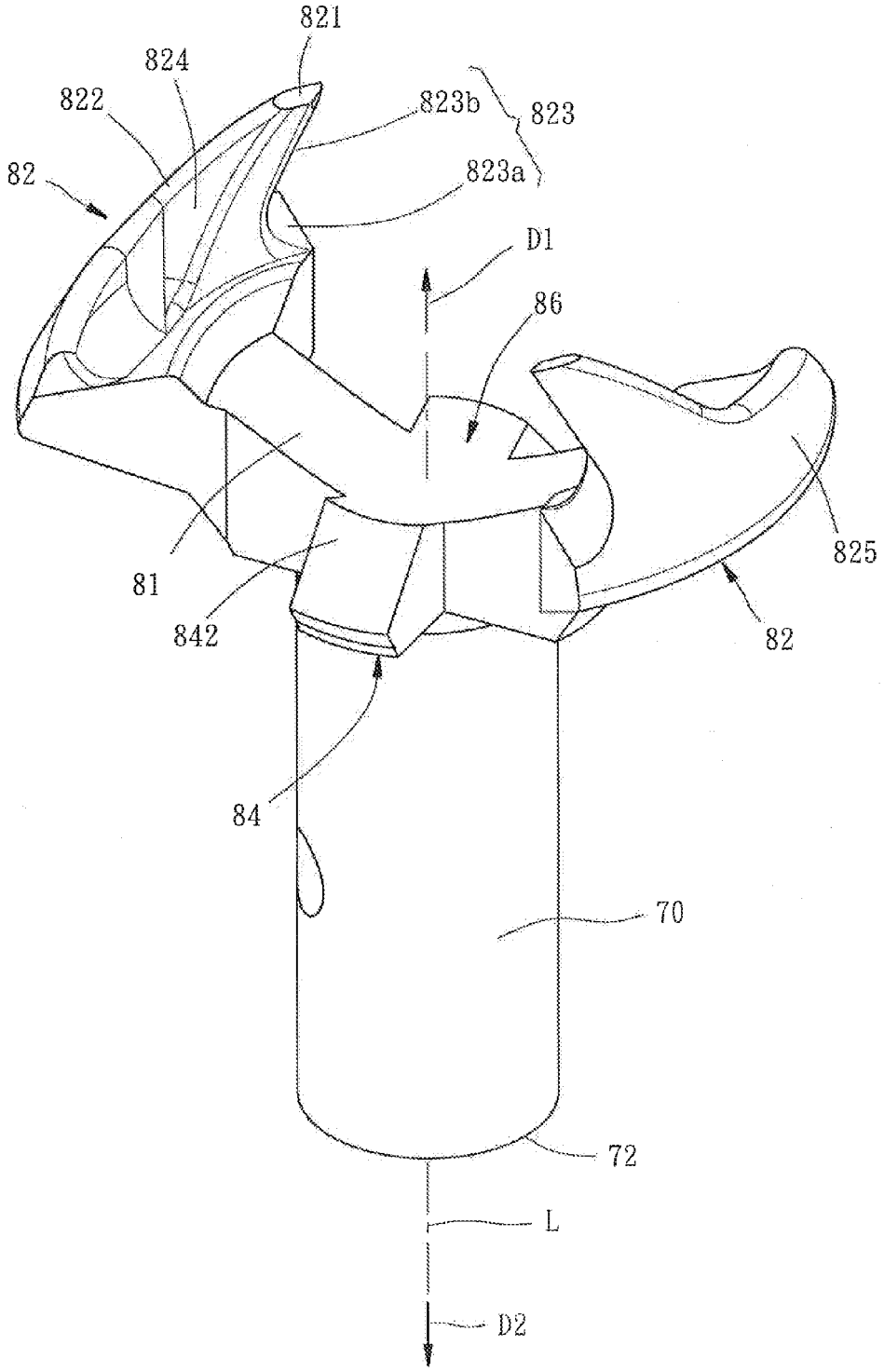
FIG. 5 is a tridimensional view of the transmission unit of the transmission device for a photosensitive drum provided by the first preferred embodiment of the present invention.

The engagement blocks 82 are configured extending from two opposite sides of the base 81 respectively, which are about the upside and the downside of the base 81 shown in FIG. 2, away from the imaginary axis L and toward the first direction D1. As shown in FIGS. 3-5, each engagement block 82 has an outer surface 825 extending gradually close to the imaginary axis L toward the first direction D1, an inner surface 824 facing the receiving space 86, an inclined top surface 822 at a junction between the outer surface 825 and the inner surface 824, an engagement concave 823 at another junction between the outer surface 825 and the inner surface 824, and a vertex 821 located between the inclined top surface 822 and the engagement concave 823, wherein the included angle between the extending direction of the inclined top surface 822 and the imaginary axis L is about 50 to 70 degrees, and the engagement concaves 823 of the engagement blocks 82 are opened substantially toward opposite directions which are about the left and the right in FIG. 2. Each engagement concave 823 has a circular arched recess 823a and a limiting surface 823b located between the recess 823a and the vertex 821 and substantially inclined from the vertex 821 toward the inclined top surface 822.

The guiding blocks 84 are configured extending from two other opposite sides of the base 81 respectively, which are about left side and right side of the base 81 in FIG. 2. As shown in FIGS. 3-5, each guiding block 84 has a guiding bevel 842 inclined relative to the imaginary axis L and extending gradually close to the imaginary axis L toward the first direction D1.

Figure 9:
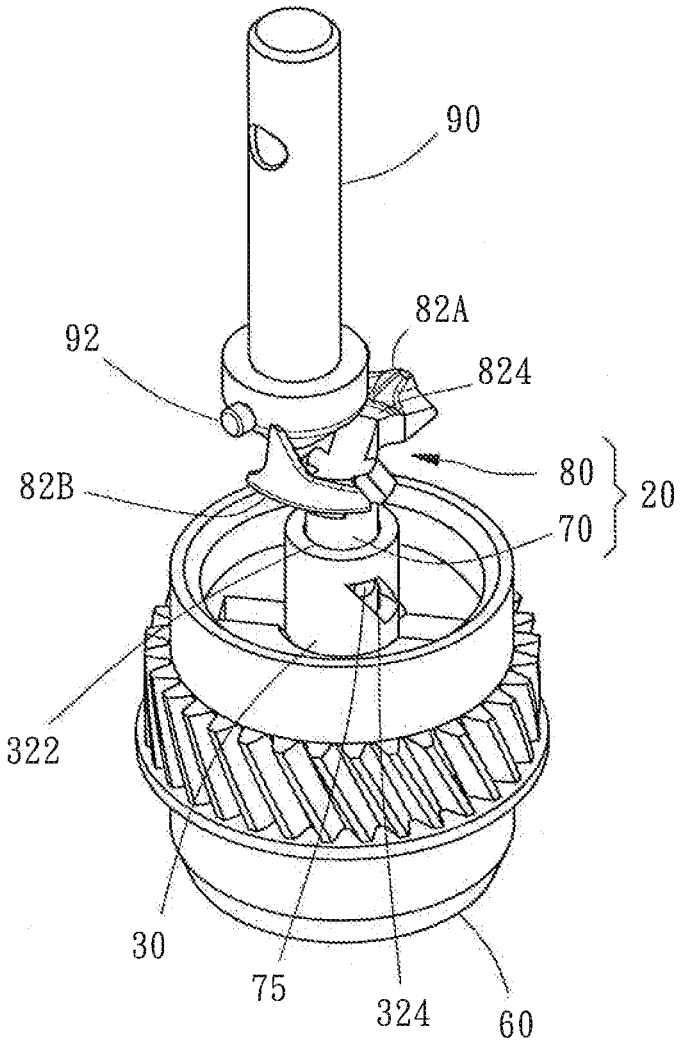
FIGS. 9-12 are tridimensional views showing the process how the transmission device for a photosensitive drum provided by the first preferred embodiment of the present invention is connected with a drive member.

Referring to FIG. 2, the sleeve 30 comprises a main body 32 *having a sidewall 32S along the imaginary axis L*, an axial hole 322 penetrating the main body 32 along the imaginary axis L, two through grooves 324 located at *the sidewall 32S of* the main body 32 *and being through the sidewall 32S of the main body 32*, communicated with the axial hole 322 and inclined relative to the imaginary axis L, and two pillars 34 protruding from the main body 32. Only one of the through grooves 324 is shown in the figures, and the other through groove 324 is located opposite to the through groove 324 shown in the figures. The through grooves 324 and the inclined top surfaces 822 of the engagement blocks 82 extend toward the first direction D1 aslope along the same rotation direction which is clockwise when they are viewed toward the second direction D2 in this embodiment. The shaft 70 of the transmission unit 20 is disposed in the axial hole 322 and capable of rotating and moving axially. The pin 40 is inserted into the opening 73 of the transmission unit 20 in such a way that the shaft 70 of the transmission unit 20 has two protrusions 75 extending along the shaft's radial direction. Only one of the protrusions 75 is shown in FIG. 9, and the other protrusion 75 is located opposite to the protrusion 75 shown in FIG. 9. The protrusions 75, which are formed by the two parts of the pin 40 that protrude out of the opening 73, are movably inserted into the through grooves 324 respectively.

It will be appreciated that the opening 73 of the transmission unit 20 can also be provided without penetrating the shaft 70; in that condition, the shaft 70 of the transmission unit 20 only has one protrusion 75 and the sleeve 30 only needs to be provided with one through groove 324. Besides, the protrusion 75 of the shaft 70 is not limited to be formed by the pin 40 inserted into the opening 73. For example, the protrusion 75 can be protruded from the shaft body 74 integrally; in that condition, the through groove 324 should have an open end so that the protrusion 75 can enter the through groove 324 through its open end, and the open end of the through groove 324 should be capped by an annular cap provided at, but not limited to, the shaft 70.

Figure 6:
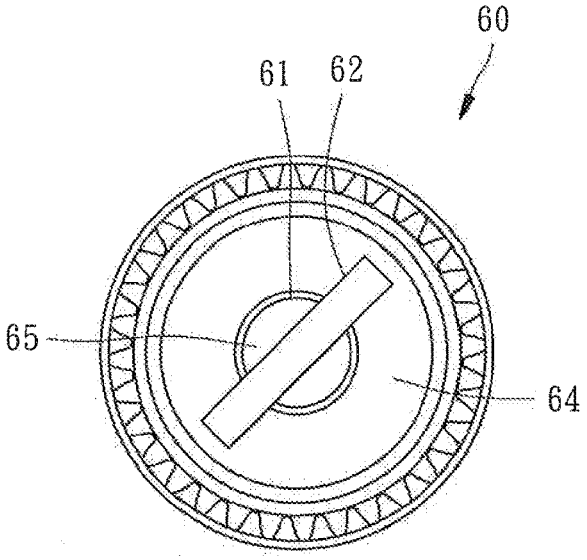
FIG. 6 is a front view of a shell of the transmission device for a photosensitive drum provided by the first preferred embodiment of the present invention.
Figure 7:
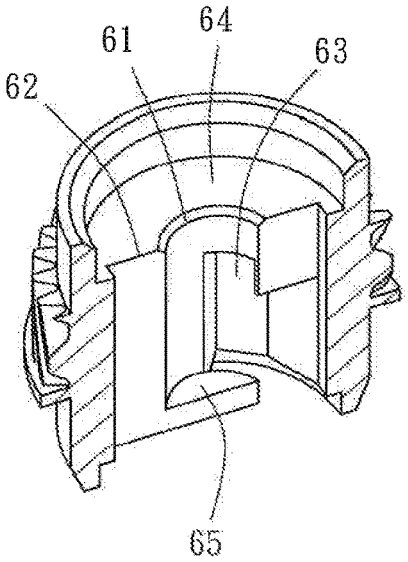
FIG. 7 is a partially cut-away perspective view of the shell of the transmission device for a photosensitive drum provided by the first preferred embodiment of the present invention.

Referring to FIGS. 2, 6 and 7, the shell 60 has a pipe 66, a top wall 64 located at a side of the pipe 66, and a bottom wall 65 located at another side of the pipe 66. The peripheral configuration of the shell 60 is similar to the conventional ones. Inside the shell 60, there are a receiving hole 61, an installation slot 62, and two limiting recesses 63 communicated with each other. Only one of the limiting recesses 63 is shown in FIG. 7, and the other limiting recess 63 is located opposite to the limiting recess 63 shown in FIG. 7. The receiving hole 61 extends along the imaginary axis L and opened on the top wall 64. The installation slot 62 extends from the receiving hole 61 toward the two opposite radial directions of the receiving hole 61 and opened on the top wall 64. The limiting recesses 63 are located adjacent to the installation slot 62, extending parallel to the imaginary axis L and not opened on the top wall 64.

Figure 8:
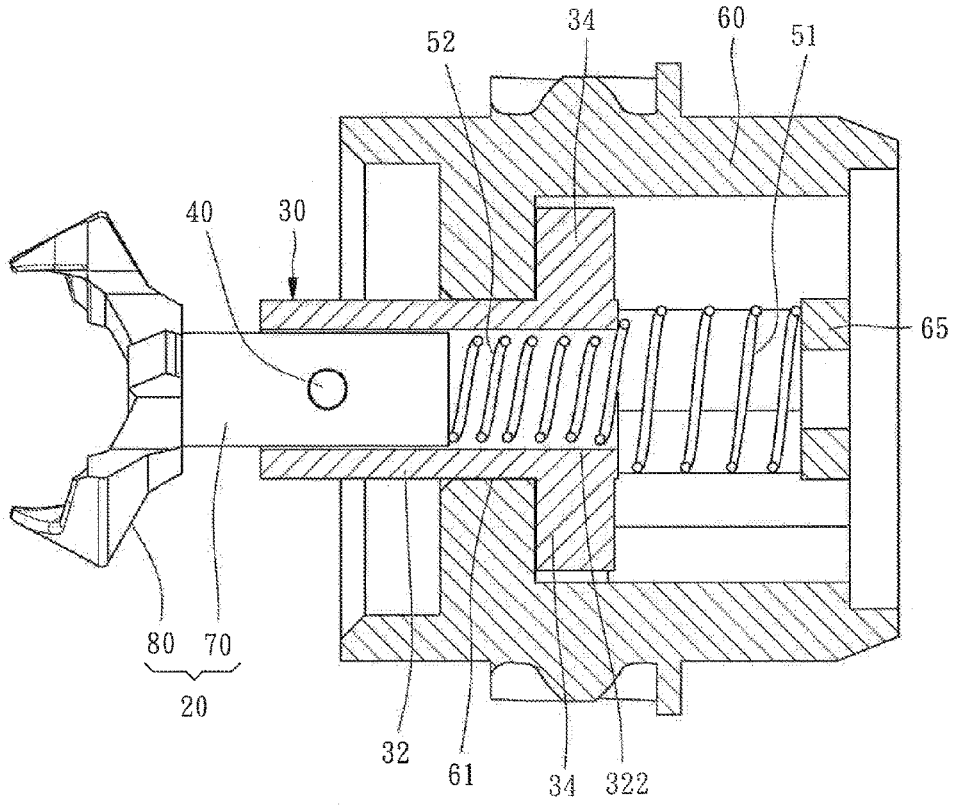
FIG. 8 is a sectional view taking along the line 8-8 in FIG. 1.

Referring to FIGS. 2 and 8, the elastic member 50 has a relatively larger radius section 51 and a relatively smaller radius section 52 connected with the relatively larger radius section 51. The elastic member 50 and the sleeve 30 are installed into the receiving hole 61 of the shell 60 in order. When the sleeve 30 is installed, the relatively smaller radius section 52 is inserted into the axial hole 322 of the sleeve 30 first; then, the main body 32 is inserted into the receiving hole 61, and the pillars 34 enter the installation slot 62 at the same time. At this time, the sleeve 30 has to receive a force exerting along the imaginary axis L to make the relatively larger radius section 51 compressed elastically with two ends thereof abutted against the sleeve 30 and the bottom wall 65 of the shell 60 and the relatively smaller radius section 52 also compressed elastically with an end thereof abutted against the second end 72 of the shaft 70 of the transmission unit 20 so that the relatively larger radius section 51 and the relatively smaller radius section 52 may generate elastic rebound force along the imaginary axis L. Then, the sleeve 30 has to be turned to cause the pillars 34 to enter the limiting recesses 63 respectively so that the sleeve 30 is limited in the shell 60. In the end, when the force exerting on the sleeve 30 is released, the elastic rebound force generated by the relatively larger radius section 51 makes the sleeve 30 return back to be abutted against the shell 60, as shown in FIG. 8. As a result, the sleeve 30 is coupled with the shell 60 unrotatably and movably along the imaginary axis L.

When the aforesaid transmission device 10 provided by the present invention is used, the shell 60 is fastened to a photosensitive drum which is adapted for installation in a toner cartridge (not shown), and the engagement structure 80 of the transmission unit 20 sticks out of an end of the toner cartridge. When the user puts the aforesaid toner cartridge into a housing of an electronic image forming apparatus (not shown), the engagement structure 80 of the transmission unit 20 will be engaged with a drive member 90 (shown in FIGS. 9-19) located in the housing in such a way that a part of the drive member 90 is received in the receiving space 86 and the engagement concaves 823 are received and engaged with two pillars 92 of the drive member 90 respectively so that the photosensitive drum will be driven to rotate by the drive member 90.

Figure 10:
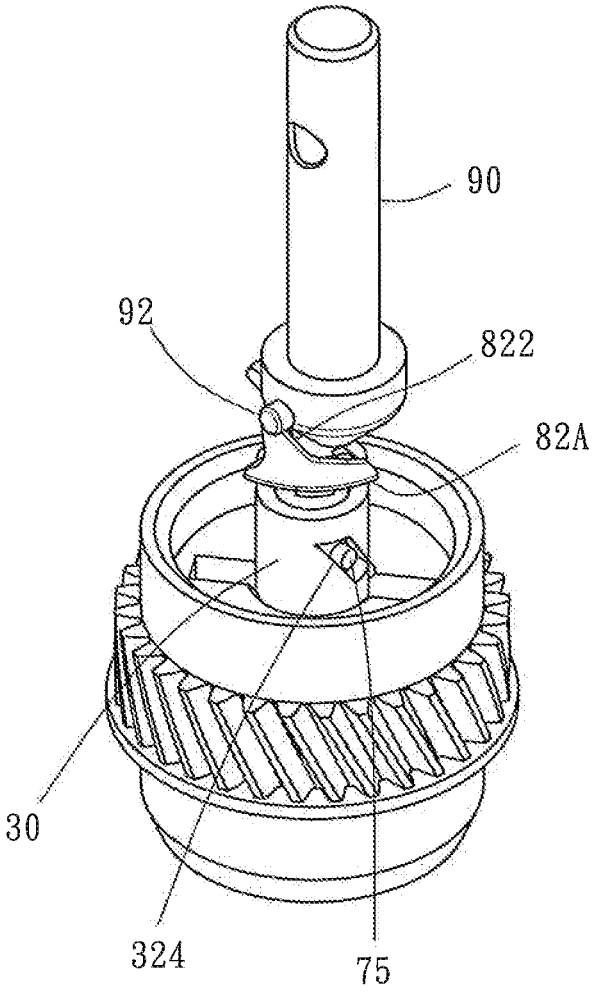
Figure 11:
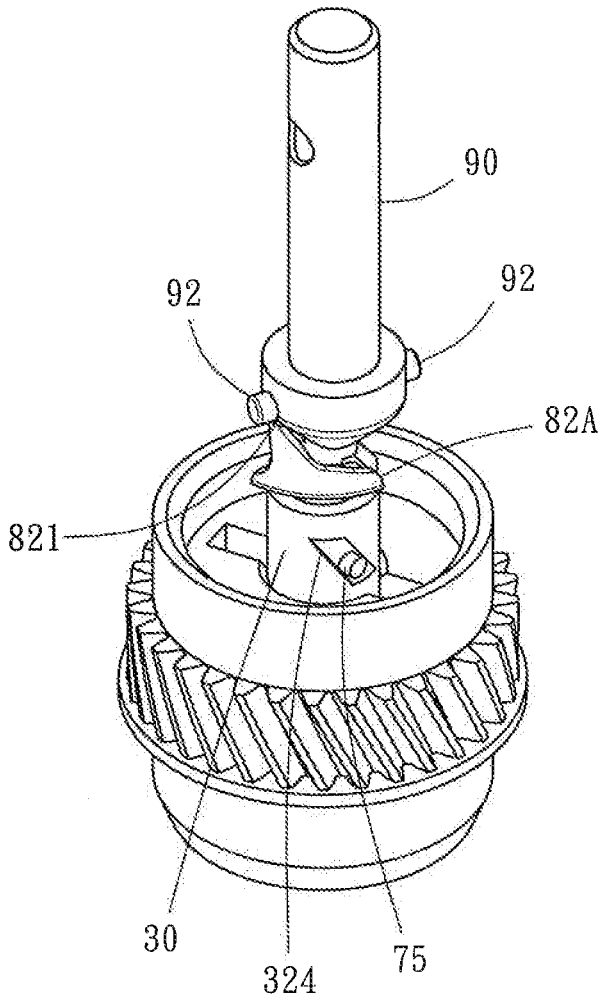
Figure 12:
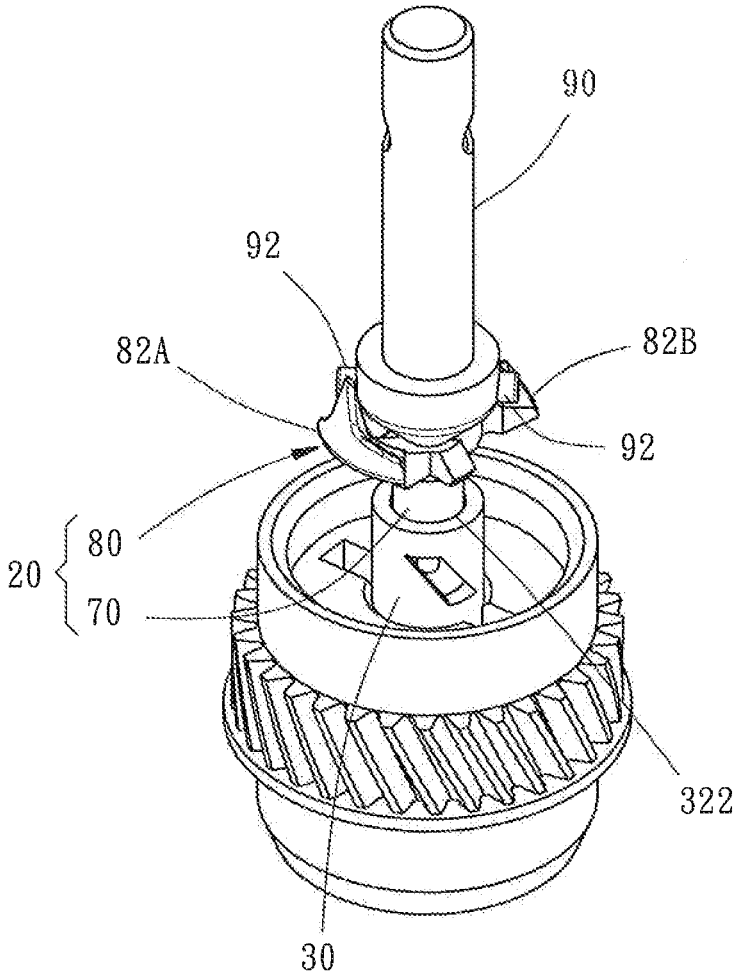
Figure 13:
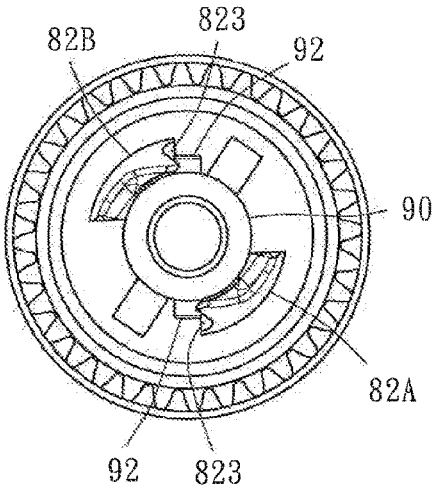
FIGS. 13-14 are a front view and a lateral side view of the transmission device for a photosensitive drum provided by the first preferred embodiment of the present invention and the drive member, which are connected with each other.
Figure 14:
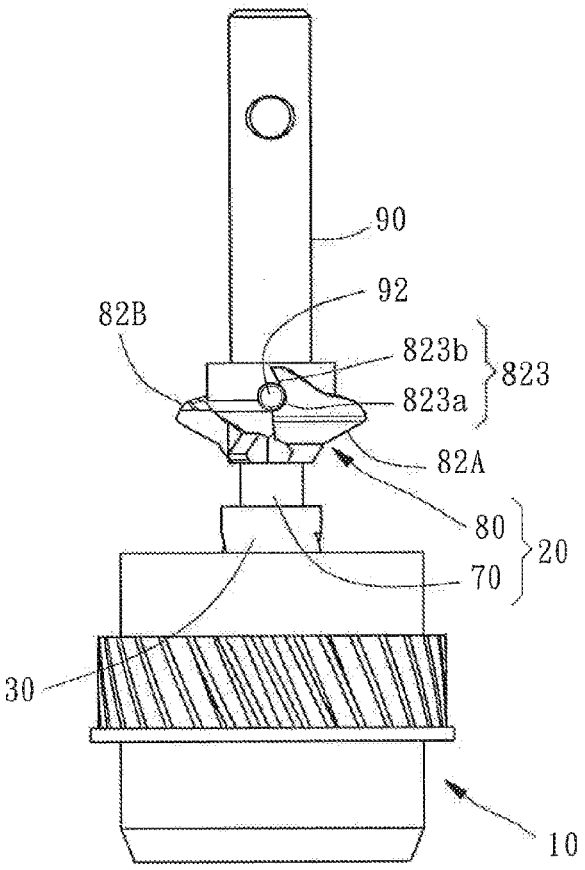

The process of how the transmission device 10 for a photosensitive drum is engaged with the drive member 90 is illustrated in FIGS. 9-14 wherein the aforesaid engagement blocks 82 are hereinafter denoted as a first engagement block 82A and a second engagement block 82B for the convenience of illustrating the engaging process more clearly. In FIG. 9, the inner surface 824 of the first engagement block 82A is touched by the drive member 90; at this time, the drive member 90 starts to push the transmission unit 20 toward the shell 60, i.e. toward the second direction D2, to make the transmission unit 20 move inwards along the axial hole 322 of the sleeve 30. At the same time, the protrusions 75 are guided by the through grooves 324 of the sleeve 30 to cause the transmission unit 20 to rotate so that one of the pillars 92 of the drive member 90 slides along the inclined top surface 822 of the first engagement block 82A, as shown in FIG. 10, and passes over the vertex 821 of the first engagement block 82A, as shown in FIG. 11. After that, the transmission unit 20 is no longer pushed by the drive member 90 so as to be forced by the elastic rebound force generated by the relatively smaller radius section 52 to move outwards along the axial hole 322 of the sleeve 30, i.e. toward the first direction D1, and rotate at the same time. Then, the engagement concaves 823 are engaged with the pillars 92 of the drive member 90 respectively, as shown in FIGS. 12-14.

As a result, when the drive member 90 in FIG. 13 rotates counterclockwise, the pillars 92 will push the engagement blocks 82A and 82B respectively to drive the transmission device 10 rotate counterclockwise, too. At this time, the engagement between the engagement concaves 823 and the pillars 92 causes the rotating transmission unit 20 unable to move inwards along the axial hole 322 of the sleeve 30, i.e.

toward the second direction D2 so the drive member 90 will drive the transmission device 10 to rotate continuously. It will be appreciated that the pillars 92 of the drive member 90 abut against the recesses 823a of the engagement concaves 823 in FIG. 14, but also can be set to abut against the limiting surfaces 823b of the engagement concaves 823. The aforesaid two conditions both can result in the aforesaid transmission effect, which means the transmission device 10 can be driven to rotate no matter the pillars 92 of the drive member 90 abut against the recesses 823a or the limiting surfaces 823b.

Figure 15:
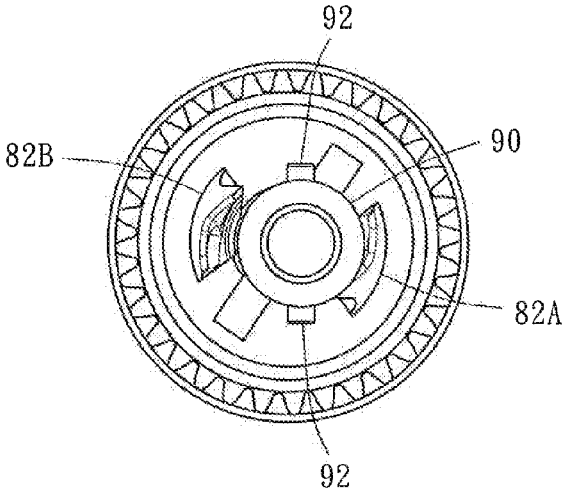
FIG. 15 is similar to FIG. 13, but showing the beginning of separation of the transmission device for a photosensitive drum provided by the first preferred embodiment of the present invention from the drive member.
Figure 16:
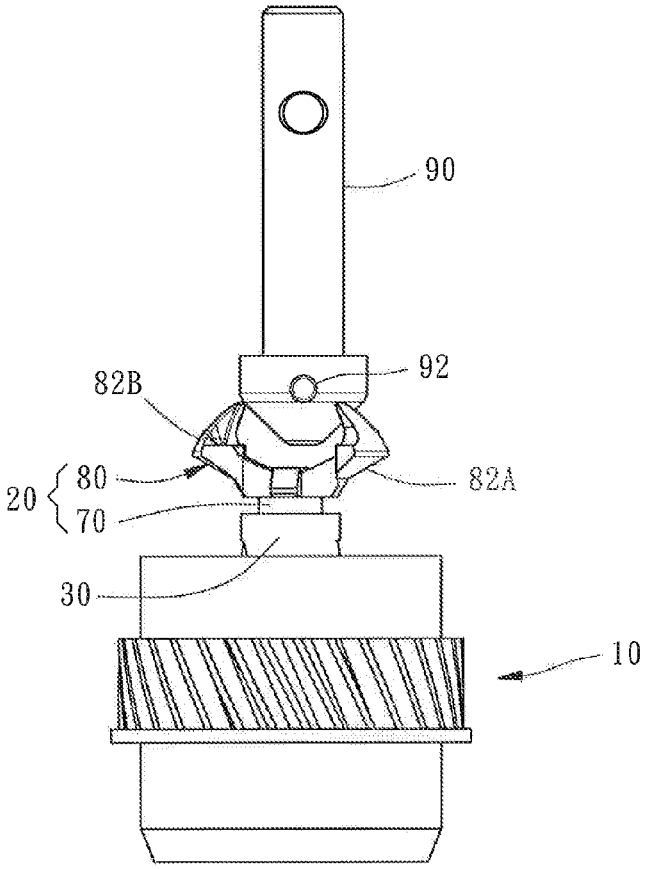
FIGS. 16-19 are similar to FIG. 14, but showing the process how the transmission device for a photosensitive drum provided by the first preferred embodiment of the present invention is separated from the drive member.
Figure 17:
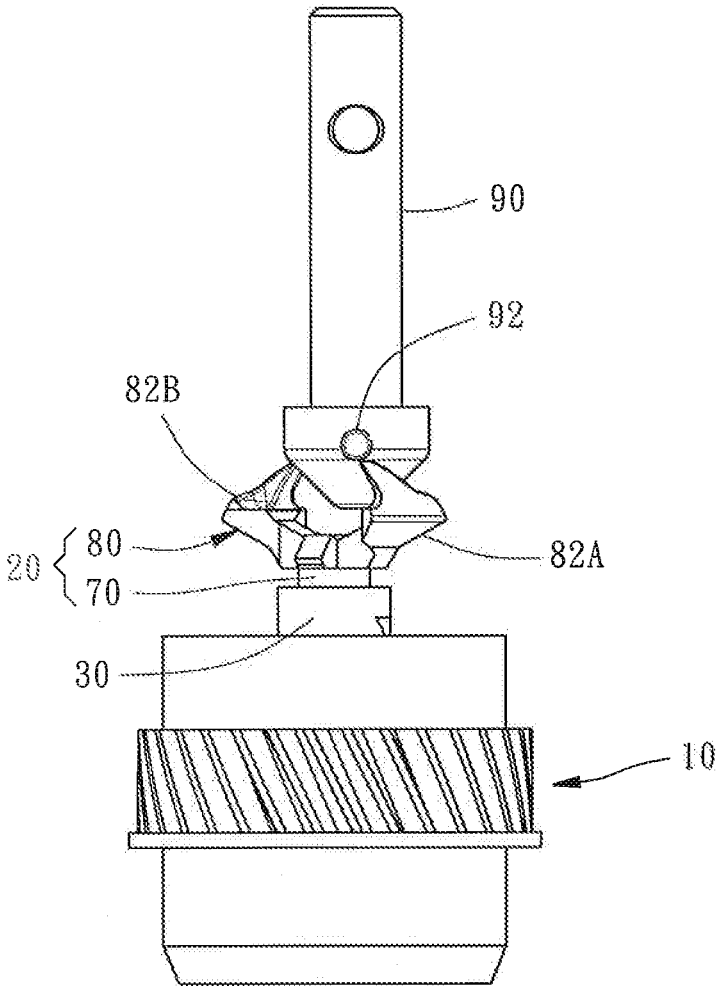
Figure 18:
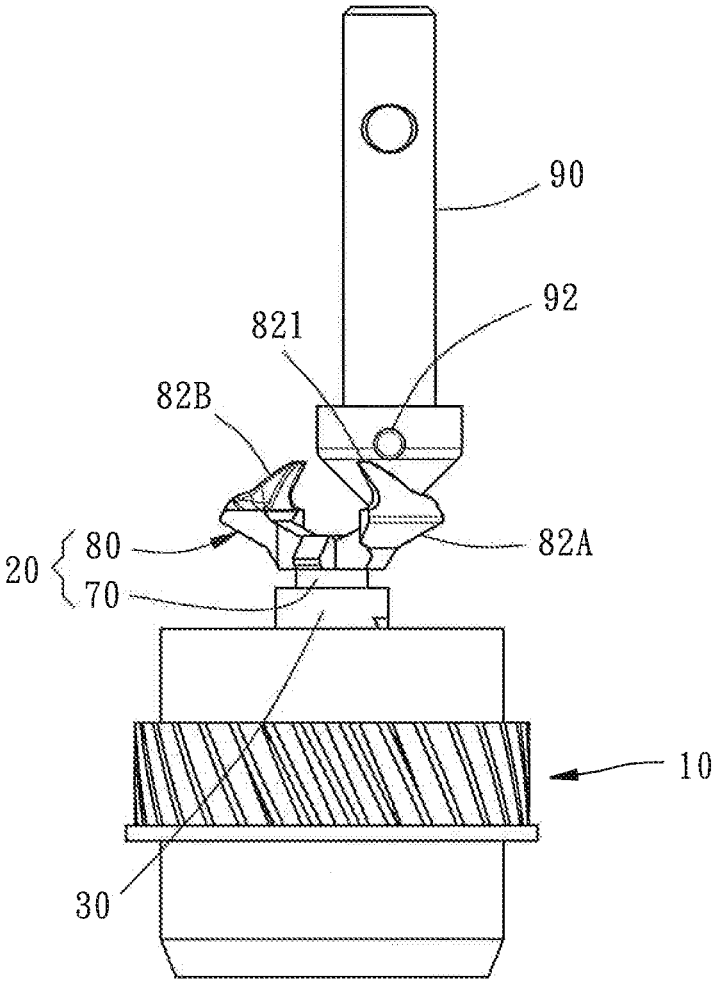
Figure 19:
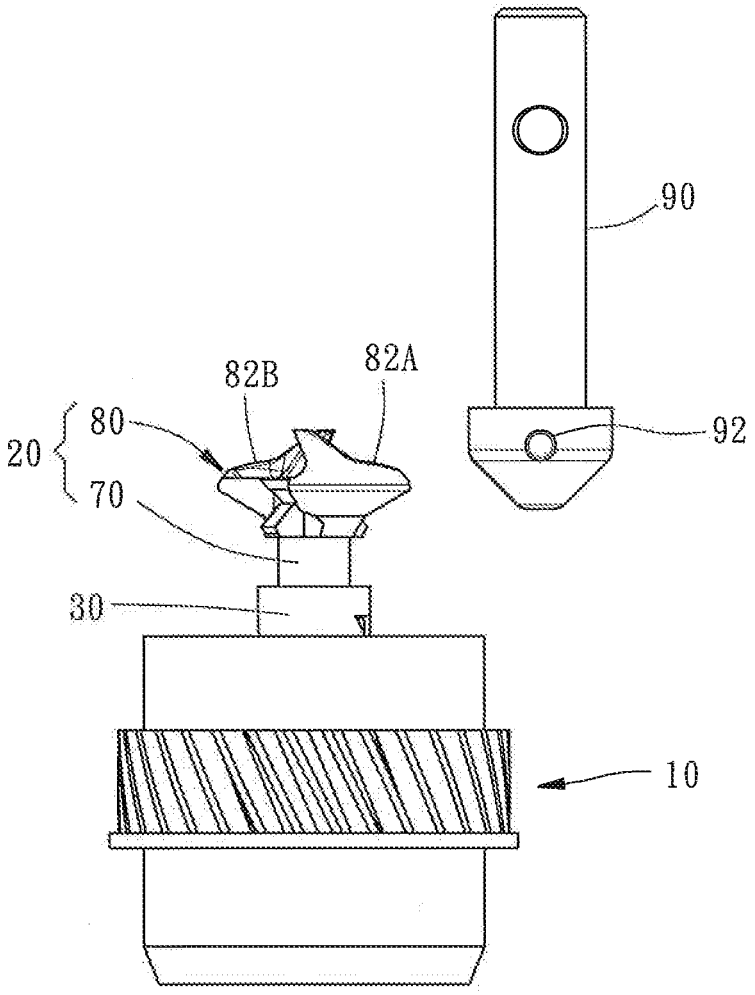
Figure 20:
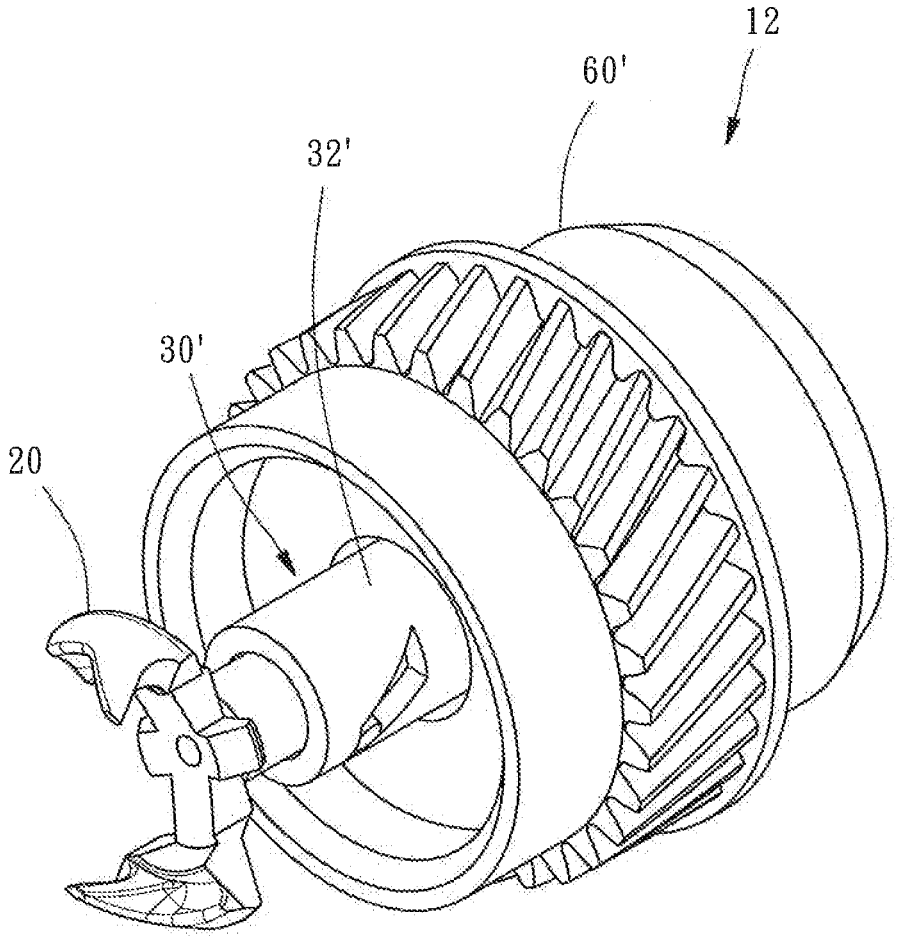
FIG. 20 is an assembled perspective view of a transmission device for a photosensitive drum provided by a second preferred embodiment of the present invention.
Figure 21:
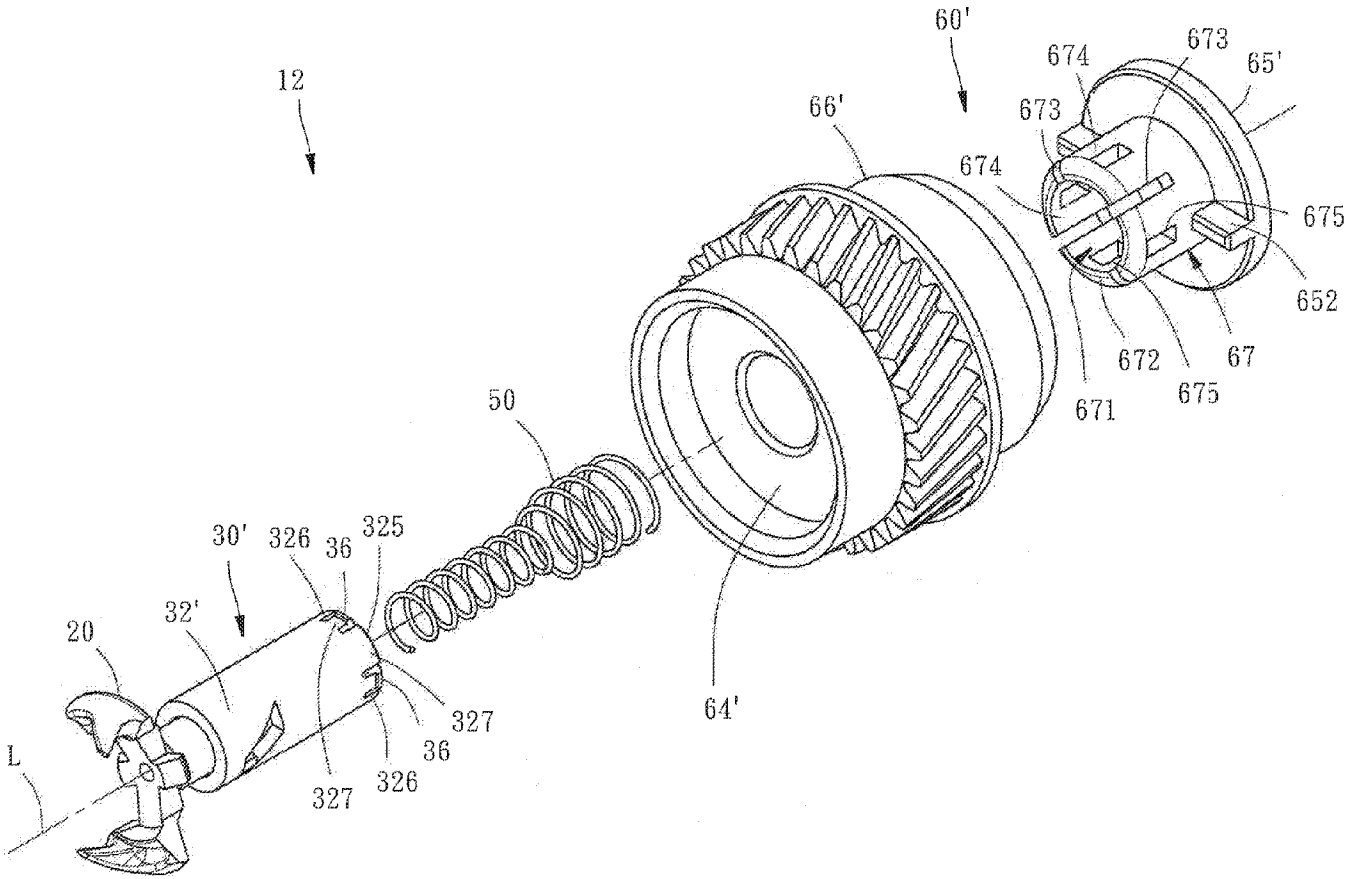
FIG. 21 is an exploded perspective view of the transmission device for a photosensitive drum provided by the second preferred embodiment of the present invention.
Figure 22:
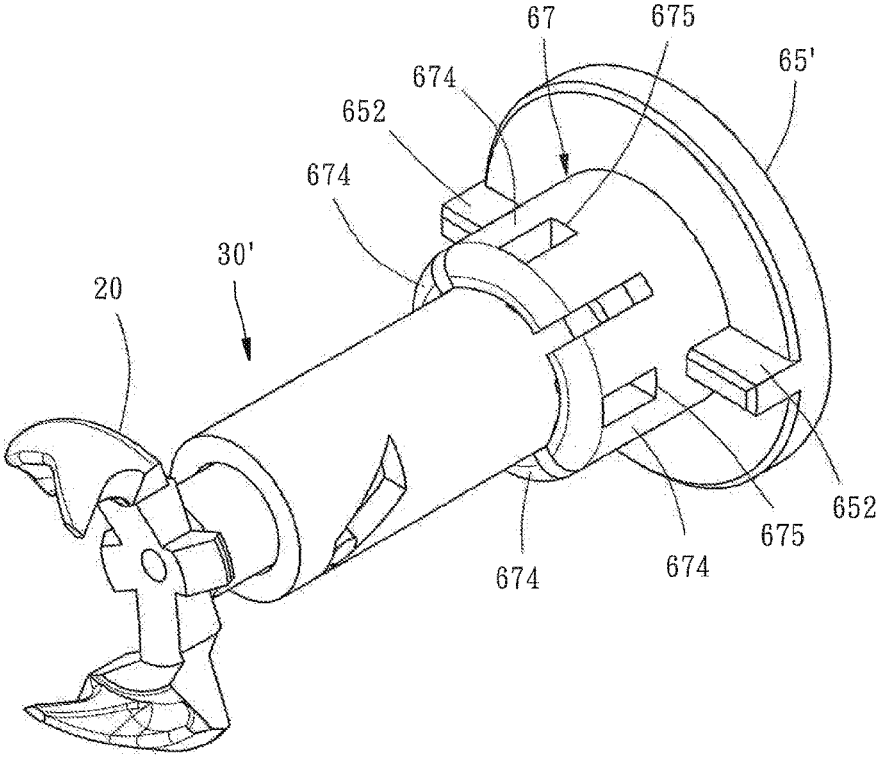
FIG. 22 is similar to FIG. 20, but wherein a shell of the transmission device for a photosensitive drum is not shown for the convenience of illustration.
Figure 23:
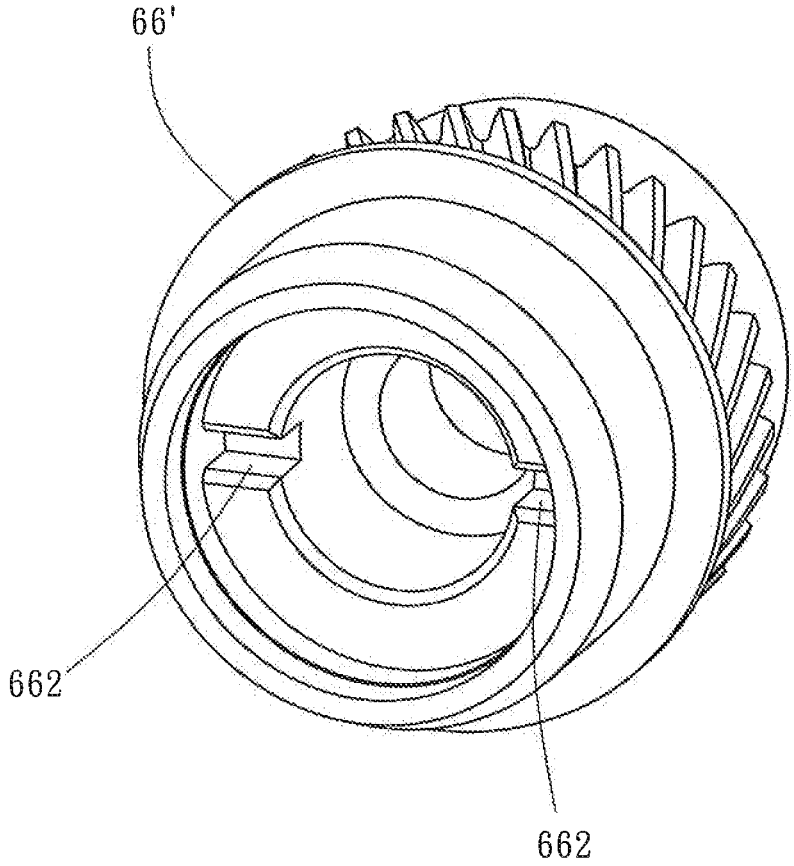
FIG. 23 is a tridimensional view showing a part of the shell of the transmission device for a photosensitive drum provided by the second preferred embodiment of the present invention.

FIGS. 15-19 illustrate the process how the transmission device 10 is separated from the drive member 90 by moving from the position shown in FIGS. 13-14 toward the left, wherein the aforesaid engagement blocks 82 are also denoted as a first engagement block 82A and a second engagement block 82B for the convenience of illustrating the separating process more clearly. At first, the second engagement block 82B is separated from one of the pillars 92 directly, and the first engagement block 82A and the other pillar 92 push each other so that the transmission unit 20 in FIG. 13 rotates counterclockwise, as shown in FIG. 15. At this time, because the drive member 90 is stationary, the rotating transmission unit 20 overcomes the elastic rebound force generated by the relatively smaller radius section 52 of the elastic member 50 and moves inwards along the axial hole 322 of the sleeve 30, i.e. toward the second direction D2, as shown in FIG. 16, so that the first engagement block 82A is separated from the pillar 92. At this time, because the first engagement block 82A is still abutted against the body of the drive member 90, and the transmission device 10 continuously moves toward the left, the transmission unit 20 and the sleeve 30 overcome the elastic rebound force generated by the relatively larger radius section 51 of the elastic member 50 to cause the pillar 92 to pass over the vertex 821 of the first engagement block 82A and then separated from it, as shown in FIGS. 17-18. As a result, the transmission device 10 is separated from the drive member 90.

The transmission device 10 for a photosensitive drum provided by the present invention is simpler in structure than the conventional ones, and the way that the transmission device 10 is connected with and separated from the drive member 90 of an electronic image forming apparatus is different from the conventional ones. By the feature that the transmission unit 20 can move along the imaginary axis L and rotate about the imaginary axis L at the same time and the specially designed shape of the engagement blocks 82 of the transmission unit 20, no matter what angle the transmission device 10 is presented when entering or exiting the housing of the electronic imaging device, the transmission unit 20 will be connected with the drive member 90 firmly and separated from the drive member 90 smoothly.

The aforesaid processes of how the transmission device 10 is connected with and separated from the drive member 90 are only possible ones of many conditions. For example, when the transmission device 10 is going to be connected with the drive member 90, the drive member 90 might first touch one of the engagement blocks 82 at its inner surface 824, as the condition illustrated before, or at its outer surface 825, which is more possible in fact. In addition to the engagement block 82, the drive member 90 might touch the guiding bevel 842 of one of the guiding blocks 84 at first; in that condition, the guiding bevel 842 helps guiding the drive member 90 to enter the receiving space 86. However, the transmission device provided by the present invention can also be provided without the guiding block 84 and with more than two engagement blocks 82. Besides, the shape of the engagement concave 823 of each engagement block 82 is not limited to that provided in this embodiment, as long as the engagement concave 823 can be engaged with the pillar 92 of the drive member 90, and at the same time the pillar 92 can be hooked by a part of the engagement concave 823, e.g. the limiting surface 823b in the aforesaid embodiment, to cause the transmission unit 20 unable to move toward the second direction D2 when the transmission unit 20 is driven to rotate.

Furthermore, the way that the sleeve 30 and the elastic member 50 are mounted in the shell 60 is not limited to that provided in the aforesaid embodiment. For example, the pillars 34 of the sleeve 30 and the limiting recesses 63 of the shell 60 can be replaced by recesses and protrusions, respectively. In another example, the bottom wall 65 of the shell 60 can be mounted to the pipe 66 detachably so that the transmission unit 20 and the sleeve 30 coupled together and the elastic member 50 can be installed into the shell 60 from its bottom; in this condition, the shell 60 can be provided without the installation slot 62. The way that the sleeve 30 and the elastic member 50 are mounted in the shell 60 also can be the design provided in the following two embodiments.

Referring to FIGS. 20-23, a transmission device 12 for a photosensitive drum, which is provided by a second preferred embodiment of the present invention, comprises a sleeve 30' and a shell 60' different from those in the aforesaid embodiment.

The main body 32' of the sleeve 30' has a bottom end 325 and a plurality of slots 326 concaved from the bottom end 325. There is an elastic block 327 formed between every two adjacent slots 326, and the sleeve 30' further has a plurality of convexities 36 protruding from some of the elastic blocks 327.

The bottom wall 65' of the shell 60' is detachably mounted to the pipe 66', and the shell 60' further has a coupling portion 67 protruding from the bottom wall 65' toward the top wall 64'. The coupling portion 67 is annular member having a coupling concave 671 at the center; besides, the coupling portion 67 has a top end 672 and a plurality of slots 673 concaved from the top end 672 toward the bottom wall 65'. There is an elastic block 674 formed between every two adjacent slots 673, and there is a through groove 675 located at each elastic block 674 and extending along the imaginary axis L. In this embodiment, the pipe 66' of the shell 60' has two fitting slots 662, and the bottom wall 65' of the shell 60' has two fitting blocks 652 inlaid in the fitting slots 662 respectively to make the bottom wall 65' unrotatable relative to the pipe 66'. The amounts of the fitting slots 662 and the fitting blocks 652 are unlimited as long as their amounts are the same. The bottom wall 65' can also be connected with the pipe 66' integrally; however, the design that the bottom wall 65' is separable from the pipe 66' as in this embodiment is more convenient in assembly. Besides, the design that the pipe has the fitting blocks and the bottom wall has the fitting slots also can achieve the aforesaid effect.

By the elasticity of the elastic blocks 327 and 674, the sleeve 30' is mounted in the coupling concave 671, and the convexities 36 are inserted into the through grooves 675 and movable along the through grooves 675 so that the sleeve 30 is movable along the imaginary axis L and unrotatable relative to the shell 60.

Figure 24:
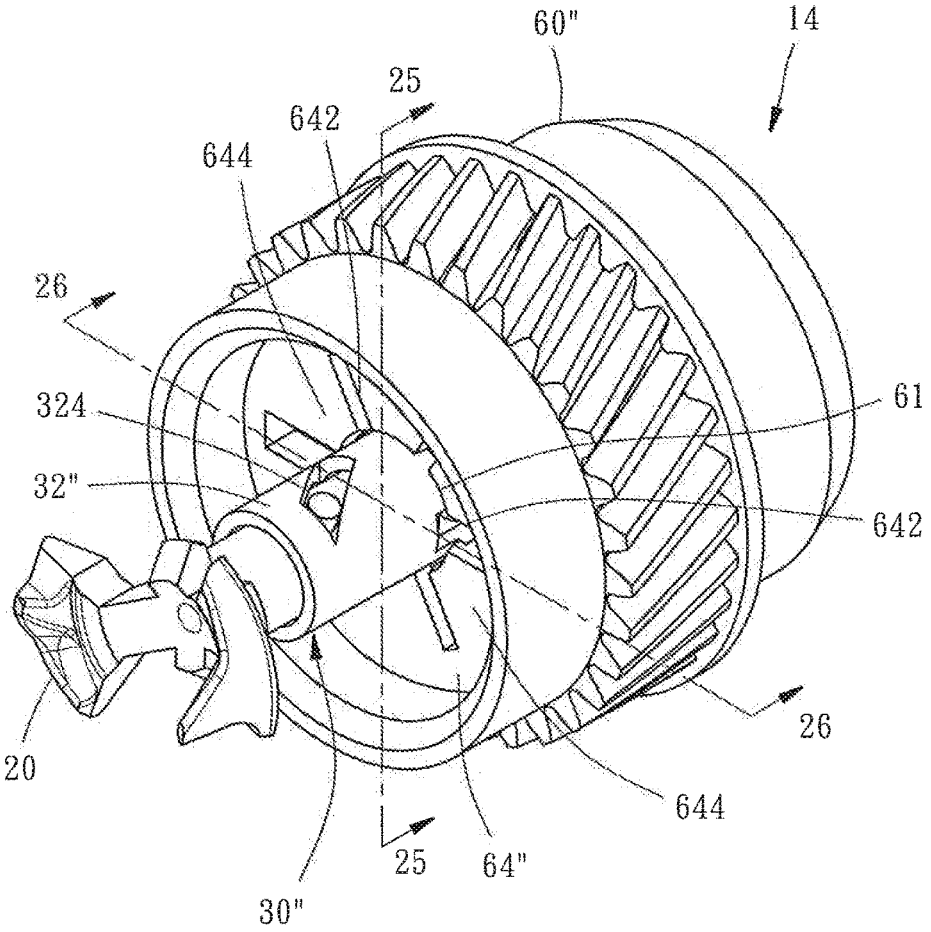
FIG. 24 is an assembled perspective view of a transmission device for a photosensitive drum provided by a third preferred embodiment of the present invention.
Figure 25:
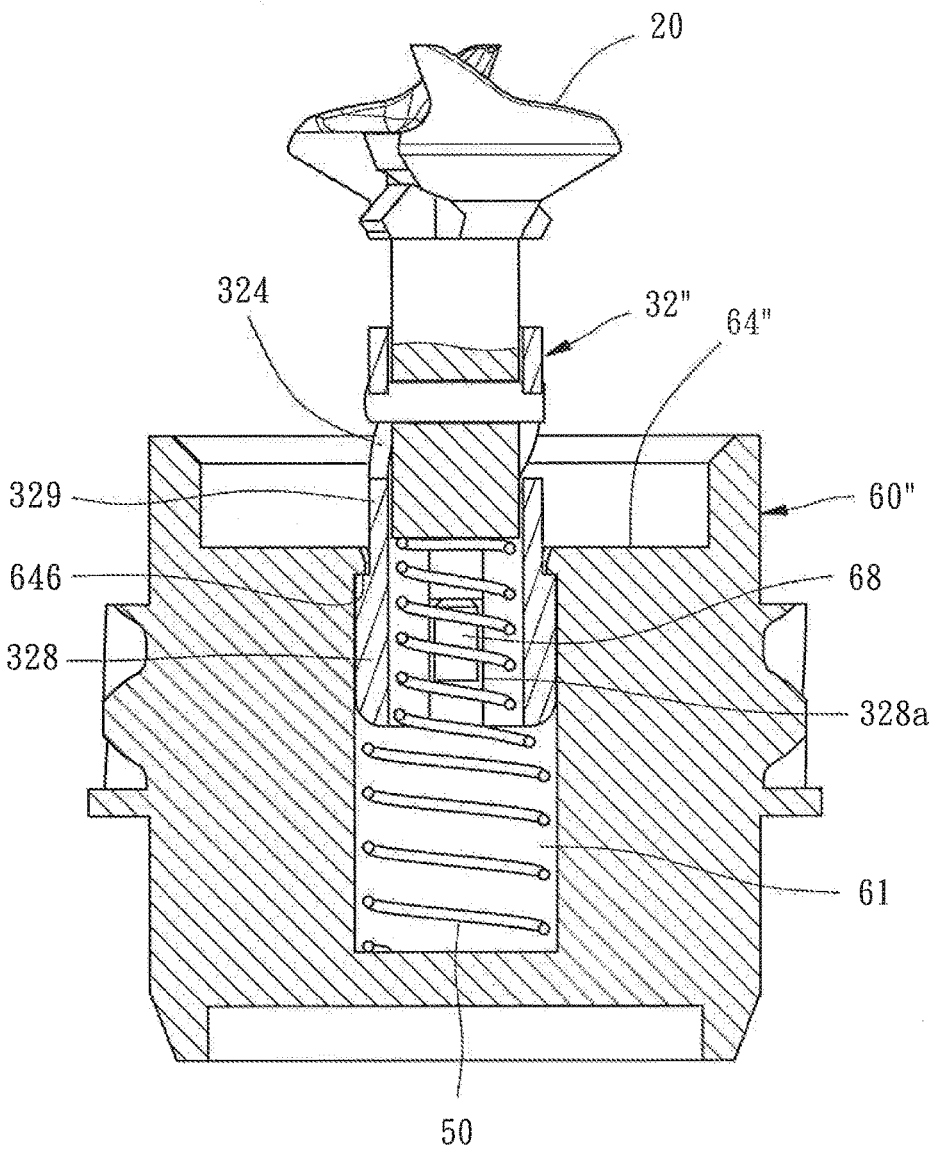
FIG. 25 is a sectional view taking along the line 25-25 in FIG. 23.
Figure 26:
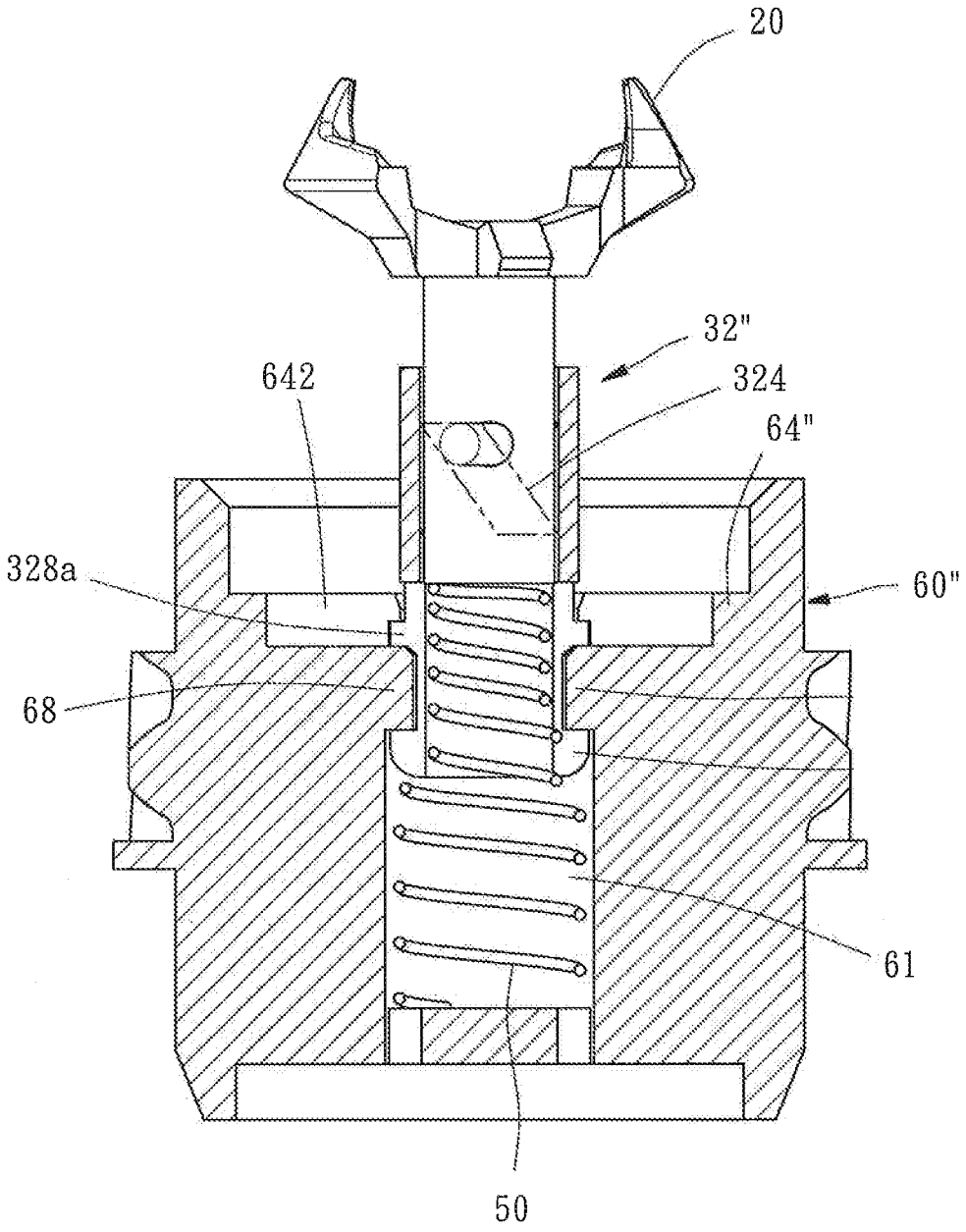
FIG. 26 is a sectional view taking along the line 26-26 in FIG. 23.

Referring to FIGS. 24-26, a transmission device 14 for a photosensitive drum, which is provided by a third preferred embodiment of the present invention, comprises a sleeve 30" and a shell 60" different from those in the aforesaid embodiments.

The main body 32" of the sleeve 30" has a relatively larger radius section 328 and a relatively smaller radius section 329 connected with the relatively larger radius section 328. The relatively larger radius section 328 is provided with two limiting grooves 328a penetrating the inner and outer surfaces of the relatively larger radius section 328. The through grooves 324 are located at the relatively smaller radius section 329. The top wall 64" of the shell 60" has a plurality of slots 642 communicated with the receiving hole 61. There is an elastic block 644 formed between every two adjacent slots 642, and each elastic block 644 has a stair 646. There are further two limiting blocks 68 in the receiving hole 61 protruding from the wall of the receiving hole 61. The amounts of the limiting grooves 328a and the limiting blocks 68 are unlimited as long as their amounts are the same. By the elasticity of the elastic blocks 644, the relatively larger radius section 328 of the sleeve 30" is inserted into the receiving hole 61 and limited in the receiving hole 61 by the stairs 646, and the limiting blocks 68 are disposed in the limiting grooves 328a, respectively. As a result, the sleeve 30" is movable along the imaginary axis L and unrotatable relative to the shell 60; besides, this embodiment is very simple in structure. The stairs 646 also can be the bottom edges of the elastic blocks 644 which are not stair-shaped.

Figure 27:
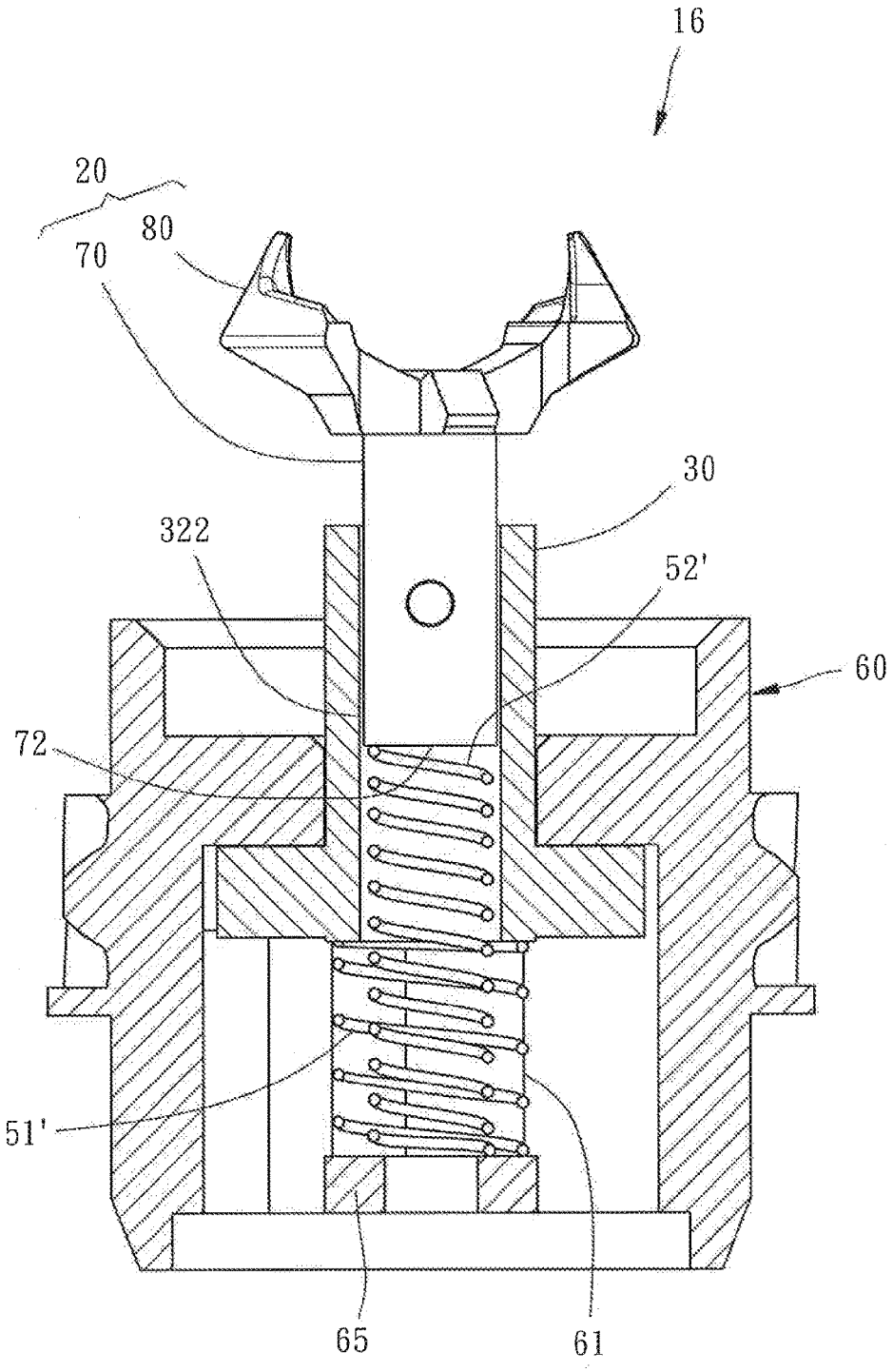
FIG. 27 is a sectional view of a transmission device for a photosensitive drum provided by a fourth preferred embodiment of the present invention.

Referring to FIG. 27, a transmission device 16 for a photosensitive drum provided by a fourth preferred embodiment of the present invention is different from that provide by the aforesaid first preferred embodiment in that the transmission device 16 comprises a first elastic member 51' and a second elastic member 52' wherein the outer radius of the first elastic member 51' is larger than that of the second elastic member 52'. The first elastic member 51' is disposed in the receiving hole 61 of the shell 60 and has two ends abutted against the bottom wall 65 of the shell 60 and the sleeve 30, respectively. The second elastic member 52' is disposed in the axial hole 322 of the sleeve 30 and the receiving hole 61 of the shell 60, and has two ends abutted against the second end 72 of the shaft 70 of the transmission unit 20 and the bottom wall 65 of the shell 60, respectively. As a result, the first elastic member 51' and the second elastic member 52' can achieve the same effect provided by the elastic member 50 in the first preferred embodiment and cost lower in manufacturing.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A transmission device (10) for a photosensitive drum, which is adapted for engagement with a drive member (90) of an electronic image forming apparatus provided with two pillars (92), said transmission device comprising:

a transmission unit (20) comprising a shaft (70) and an engagement structure (80), the shaft (70) extending along an imaginary axis (L) and being provided with a first end (71) facing toward a first direction (D1), a second end (72) facing toward a second direction (D2) opposite to the first direction (D1), and at least a protrusion (75) extending along a radial direction of the shaft (70), the engagement structure (80) being provided with a base (81) attached to the first end (71) of the shaft (70), two engagement blocks (82) extending from two opposite sides of the base (81) away from the imaginary axis (L) and toward the first direction (D1), and a receiving space (86) located between the engagement blocks (82) for receiving the drive member (90), each said engagement block (82) having an outer surface (825) extending towards the imaginary axis (L) toward the first direction (D1), an inner surface (824) facing the receiving space (86), an inclined top surface (822) at a junction between the outer surface (825) and the inner surface (824), an engagement concave (823) at another junction between the outer surface (825) and the inner surface (824), and a vertex (821) located between the inclined top surface (822) and the engagement concave (823), wherein an included angle between an extending direction of the inclined top surface (822) and the imaginary axis (L) is not equal to 90 degrees, and the engagement concaves (823) of the engagement blocks (82) are opened toward opposite directions for allowing the pillars (92) of the drive member (90) to enter the engagement concaves (823) through openings of the engagement concaves (823);

a sleeve (30) having a main body (32), an axial hole (322) penetrating the main body (32) along the imaginary axis (L), and at least a through groove (324) located at the main body (32), communicated with the axial hole (322) and inclined relative to the imaginary axis (L), the shaft (70) of the transmission unit (20) being disposed in the axial hole (322) and capable of rotating and moving axially, the through groove (324) and the inclined top surfaces (822) of the engagement blocks (82) of the transmission unit (20) extending toward the first direction (D1) aslope along the same rotation direction, the protrusion (75) of the shaft (70) being inserted into the through groove (324) movably;

a shell (60) having a pipe (66) for mounted to an end of the photosensitive drum, a top wall (64) located at a side of the pipe (66), a bottom wall (65) located at another side of the pipe (66), and a receiving hole (61) extending along the imaginary axis (L) and opened on the top wall (64) for receiving the main body (32) of the sleeve (30) so that the sleeve (30) is coupled with the shell (60) unrotatably and movably along the imaginary axis (L); and an elastic member (50) having a larger radius section (51) and a smaller radius section (52) connected with the larger radius section, the larger radius section (51) being disposed in the receiving hole (61) of the shell (60) and having two ends abutted against the bottom wall (65) of the shell (60) and the sleeve (30) respectively, the smaller radius section (52) being disposed in the axial hole (322) of the sleeve (30) and having an end abutted against the second end (72) of the shaft (70) of the transmission unit (20).

2. The transmission device (10) as claimed in claim 1, wherein the engagement structure (80) of the transmission unit (20) further comprises two guiding blocks (84) extending from two other opposite sides of the base (81); each said guiding block (84) is provided with a guiding bevel (842) extending towards the imaginary axis (L) toward the first direction (D1).

3. The transmission device (10) as claimed in claim 1, wherein the sleeve (30) further comprises two pillars (34) protruding from the main body (32); the shell (60) further has two limiting recesses (63) extending parallel to the imaginary axis (L), and being communicated with the receiving hole (61) and not opened on the top wall (64) for receiving the pillars (34) of the sleeve (30).

4. The transmission device (10) as claimed in claim 3, wherein the shell (60) further has an installation slot (62) communicated with the limiting recesses (63) and opened on the top wall (64).

5. The transmission device (12) as claimed in claim 1, wherein the sleeve (30') further has a plurality of convexities (36) protruding from the main body (32'), and the shell (60') further has a coupling portion (67) protruding from the bottom wall (65') toward the top wall (64'); the coupling portion (67) is an annular member having a coupling concave (671) at a center thereof and provided with a plurality of through grooves (675) extending along the imaginary axis (L); the sleeve (30') is mounted in the coupling concave (671), and the convexities (36) of the sleeve (30') are inserted into the through grooves (675) of the coupling portion (67) movably.

6. The transmission device (12) as claimed in claim 5, wherein the main body (32') of the sleeve (30') has a bottom end (325) and a plurality of slots (326) concaved from the bottom end (325); an elastic block (327) is formed between every two adjacent said slots (326); the convexities (36) of the sleeve (30') are located at the elastic blocks (327).

7. The transmission device (12) as claimed in claim 5, wherein the coupling portion (67) of the shell (60') has a top end (672) and a plurality of slots (673) concaved from the top end (672) toward the bottom wall (65'); an elastic block (674) is formed between every two adjacent said slots (673); the through grooves (675) of the coupling portion (67) are located at the elastic blocks (674).

8. The transmission device (12) as claimed in claim 5, wherein the pipe (66') of the shell (60') has a fitting slot (662), and the bottom wall (65') of the shell (60'), which is detachably mounted to the pipe (66'), has a fitting block (652) inlaid in the fitting slot (662).

9. The transmission device (14) as claimed in claim 1, wherein the main body (32") of the sleeve (30") has a larger radius section (328) and a smaller radius section (329) connected with the larger radius section (328);

the larger radius section (328) of the sleeve (30") is provided with a limiting groove (328a), and the through groove (324) is located at the smaller radius section (329) of the sleeve (30"); the top wall (64") of the shell (60") has a plurality of slots (642) communicated with the receiving hole (61) in which a limiting block (68) protrudes; an elastic block (644) is formed between every two adjacent said slots (642), and each said elastic block (644) has a stair (646); the larger radius section (328) of the sleeve (30") is limited in the receiving hole (61) by the stairs (646), and the limiting block (68) is disposed in the limiting groove (328a).

10. The transmission device (10) as claimed in claim 1, wherein the engagement concave (823) of each said engagement block (82) of the transmission unit (20) has a recess (823a) and a limiting surface (823b) located between the recess (823a) and the vertex (821) and inclined from the vertex (821) toward the inclined top surface (822).

11. The transmission device (10) as claimed in claim 1, wherein the shaft (70) of the transmission unit (20) has an opening (73) in which a pin (40) is inserted; the protrusion (75) is a part of the pin (40) sticking out of the opening (73).

12. A transmission device (16) for a photosensitive drum, which is adapted for engagement with a drive member (90) of an electronic image forming apparatus provided with two pillars (92), said transmission device comprising:

a transmission unit (20) comprising a shaft (70) and an engagement structure (80), the shaft (70) extending along an imaginary axis (L) and being provided with a first end (71) facing toward a first direction (D1), a second end (72) facing toward a second direction (D2) opposite to the first direction (D1), and at least a protrusion (75) extending along a radial direction of the shaft (70), the engagement structure (80) being provided with a base (81) attached to the first end (71) of the shaft (70), two engagement blocks (82) extending from two opposite sides of the base (81) away from the imaginary axis (L) and toward the first direction (D1), and a receiving space (86) located between the engagement blocks (82) for receiving the drive member (90), each said engagement block (82) having an outer surface (825) extending towards the imaginary axis (L) toward the first direction (D1), an inner surface (824) facing the receiving space (86), an inclined top surface (822) at a junction between the outer surface (825) and the inner surface (824), an engagement concave (823) at another junction between the outer surface (825) and the inner surface (824), and a vertex (821) located between the inclined top surface (822) and the engagement concave (823), wherein an included angle between an extending direction of the inclined top surface (822) and the imaginary axis (L) is not equal to 90 degrees, and the engagement concaves (823) of the engagement blocks (82) are opened toward opposite directions for allowing the pillars (92) of the drive member (90) to enter the engagement concaves (823) through openings of the engagement concaves (823);

a sleeve (30) having a main body (32), an axial hole (322) penetrating the main body (32) along the imaginary axis (L), and at least a through groove (324) located at the main body (32), communicated with the axial hole (322) and inclined relative to the imaginary axis (L), the shaft (70) of the transmission unit (20) being disposed in the axial hole (322) and capable of rotating and moving axially, the through groove (324) and the inclined top surfaces (822) of the engagement blocks (82) of the transmission unit (20) extending toward the first direction (D1) aslope along the same rotation direction, the protrusion (75) of the shaft (70) being inserted into the through groove (324) movably;

a shell (60) having a pipe (66) for mounted to an end of the photosensitive drum, a top wall (64) located at a side of the pipe (66), a bottom wall (65) located at another side of the pipe (66), and a receiving hole (61) extending along the imaginary axis (L) and opened on the top wall (64) for receiving the main body (32) of the sleeve (30) so that the sleeve (30) is coupled with the shell (60) unrotatably and movably along the imaginary axis (L);

a first elastic member (51') disposed in the receiving hole (61) of the shell (60) and having two ends abutted against the bottom wall (65) of the shell (60) and the sleeve (30) respectively; and a second elastic member (52') disposed in the axial hole (322) of the sleeve (30) and the receiving hole (61) of the shell (60) and having two ends abutted against the second end (72) of the shaft (70) of the transmission unit (20) and the bottom wall (65) of the shell (60) respectively.

13. The transmission device as claimed in claim 12, wherein the engagement structure of the transmission unit further comprises two guiding blocks extending from two other opposite sides of the base; each said guiding block is provided with a guiding bevel extending towards the imaginary axis toward the first direction.

14. The transmission device as claimed in claim 12, wherein the sleeve further comprises two pillars protruding from the main body; the shell further has two limiting recesses extending parallel to the imaginary axis, and being communicated with the receiving hole and not opened on the top wall for receiving the pillars of the sleeve.

15. The transmission device as claimed in claim 14, wherein the shell further has an installation slot communicated with the limiting recesses and opened on the top wall.

16. The transmission device as claimed in claim 12, wherein the sleeve further has a plurality of convexities protruding from the main body, and the shell further has a coupling portion protruding from the bottom wall toward the top wall; the coupling portion is an annular member having a coupling concave at a center thereof and provided with a plurality of through grooves extending along the imaginary axis; the sleeve is mounted in the coupling concave, and the convexities of the sleeve are inserted into the through grooves of the coupling portion movably.

17. The transmission device as claimed in claim 16, wherein the main body of the sleeve has a bottom end and a plurality of slots concaved from the bottom end; an elastic block is formed between every two adjacent said slots; the convexities of the sleeve are located at the elastic blocks.

18. The transmission device as claimed in claim 16, wherein the coupling portion of the shell has a top end and a plurality of slots concaved from the top end toward the bottom wall; an elastic block is formed between every two adjacent said slots; the through grooves of the coupling portion are located at the elastic blocks.

19. The transmission device as claimed in claim 16, wherein the pipe of the shell has a fitting slot, and the bottom wall of the shell, which is detachably mounted to the pipe, has a fitting block inlaid in the fitting slot.

20. The transmission device as claimed in claim 12, wherein the main body of the sleeve has a larger radius section and a smaller radius section connected with the larger radius section; the larger radius section of the sleeve is provided with a limiting groove, and the through groove is located at the smaller radius section of the sleeve; the top wall of the shell has a plurality of slots communicated with the receiving hole in where a limiting block protrudes; an elastic block is formed between every two adjacent said slots, and each said elastic block has a stair; the larger radius section of the sleeve is limited in the receiving hole by the stairs, and the limiting block is disposed in the limiting groove.

21. The transmission device as claimed in claim 12, wherein the engagement concave of each said engagement block of the transmission unit has a recess and a limiting surface located between the recess and the vertex and inclined from the vertex toward the inclined top surface.

22. The transmission device as claimed in claim 12, wherein the shaft of the transmission unit has an opening in which a pin is inserted; the protrusion is a part of the pin sticking out of the opening.

*23. A transmission device for a photosensitive drum, which is adapted for engagement with a drive member of an electronic image forming apparatus, said transmission device comprising:*

*a transmission unit comprising a shaft extending along an imaginary axis and having at least a protrusion extending along a radial direction of the shaft, and an engagement structure attached to a first end of the shaft;*

*a sleeve having a main body having a sidewall along the imaginary axis, an axial hole penetrating the main body along the imaginary axis, and at least a through groove located at the sidewall of the main body and being through the sidewall of the main body, communicated with the axial hole and inclined relative to the imaginary axis at an acute angle, the shaft of the transmission unit being disposed in the axial hole and the protrusion of the shaft being inserted into the through groove such that the shaft is rotatable about the imaginary axis relative to the sleeve and movable along the imaginary axis relative to the sleeve; and*

*a shell being mounted to an end of the photosensitive drum and having a receiving hole extending along the imaginary axis for receiving the main body of the sleeve so that the sleeve is coupled with the shell unrotatably and movably along the imaginary axis relative to the shell.*

*24. The transmission device as claimed in claim 23, wherein the engagement structure is provided with a base attached to the first end of the shaft, two engagement blocks extending from two opposite sides of the base away from the imaginary axis and toward the first direction, and a receiving space located between the engagement blocks for receiving the drive member.*

*25. The transmission device as claimed in claim 23, wherein the shell has a pipe being mounted to the end of the photosensitive drum, a top wall located at a side of the pipe, a bottom wall located at another side of the pipe, and the receiving hole extending being opened on the top wall for receiving the main body of the sleeve.*

*26. The transmission device as claimed in claim 25, further comprising an elastic member having a larger radius section and a smaller radius section connected with the larger radius section, the larger radius section being disposed in the receiving hole of the shell and having two ends abutted against the bottom wall of the shell and the sleeve respectively, the smaller radius section being disposed in the axial hole of the sleeve and having an end abutted against the second end of the shaft of the transmission unit.*

*27. The transmission device as claimed in claim 25, further comprising:*

*a first elastic member disposed in the receiving hole of the shell and having two ends abutted against the bottom wall of the shell and the sleeve respectively; and*

*a second elastic member disposed in the axial hole of the sleeve and the receiving hole of the shell and having two ends abutted against the second end of the shaft of the transmission unit and the bottom wall of the shell respectively.*

* * * * *